United States Patent
Abo

(10) Patent No.: US 6,900,624 B2
(45) Date of Patent: May 31, 2005

(54) DC-DC CONVERTER WITH FEED-FORWARD AND FEEDBACK CONTROL

(75) Inventor: Shouji Abo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/296,926

(22) PCT Filed: Apr. 4, 2002

(86) PCT No.: PCT/IB02/01070

§ 371 (c)(1),
(2), (4) Date: Nov. 29, 2002

(87) PCT Pub. No.: WO02/082615

PCT Pub. Date: Oct. 17, 2002

(65) Prior Publication Data

US 2004/0100241 A1 May 27, 2004

(30) Foreign Application Priority Data

Apr. 5, 2001 (JP) ....................................... 2001-107691

(51) Int. Cl.⁷ .............................................. G05F 1/44
(52) U.S. Cl. ....................................... 323/284; 323/224
(58) Field of Search ................................. 323/224, 284; 320/140, 146; 363/49; 180/65.1; 307/10.1, 10.7

(56) References Cited

U.S. PATENT DOCUMENTS 4,809,150 A * 2/1989 Limuti et al. ............. 363/21.11
5,182,463 A * 1/1993 Yamamoto et al. ........... 307/46
6,191,558 B1   2/2001 Arai et al.

FOREIGN PATENT DOCUMENTS

| JP | A-02-060459 | 2/1990 |
|---|---|---|
| JP | A-03-183357 | 8/1991 |
| JP | A 5-176411 | 7/1993 |
| JP | A-05-292741 | 11/1993 |
| JP | A 6-284590 | 10/1994 |
| JP | A-10-337008 | 12/1998 |
| JP | A 11-4506 | 1/1999 |
| JP | 2000 341801 A | 12/2000 |
| JP | 2000 358304 A | 12/2000 |
| JP | 2000 358305 A | 12/2000 |
| JP | 2001 037070 A | 2/2001 |
| JP | A-2001-037215 | 2/2001 |
| JP | 2001 069683 A | 3/2001 |
| JP | 2001-078309 A | 3/2001 |
| JP | A-2002-159173 | 5/2002 |

* cited by examiner

Primary Examiner—Shawn Riley
(74) Attorney, Agent, or Firm—Oliff & Berridge, PLC

(57) ABSTRACT

The voltage of 36-V battery (10) is dropped by the DC—DC converter (12) to charge the 12-V battery (14). The switching ON/OFF of the DC—DC converter (12) is feed forward controlled by the controlling portion (20). This can cope with the voltage change at the 36-V battery (10). The output voltage of the DC—DC converter (12) is feed back controlled by a differential amplifier (16) and PID (18) and feed back by the controlling portion (20).

64 Claims, 9 Drawing Sheets

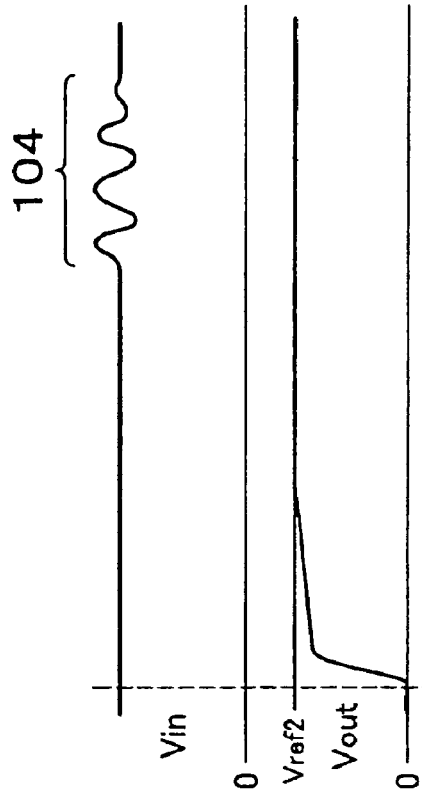
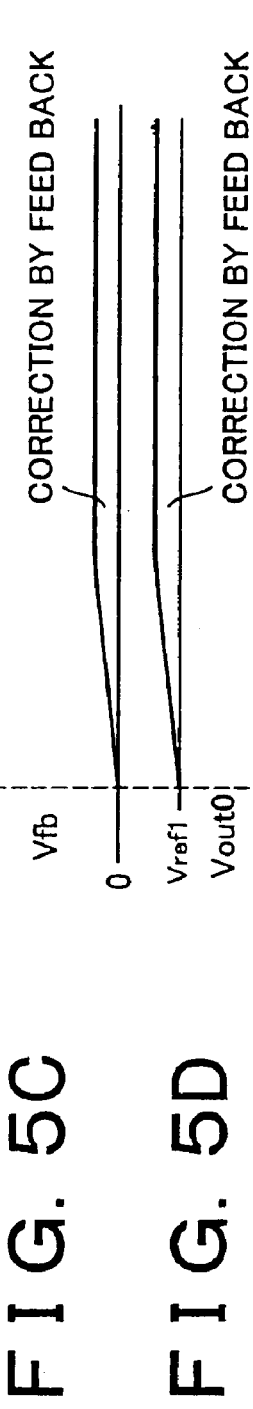
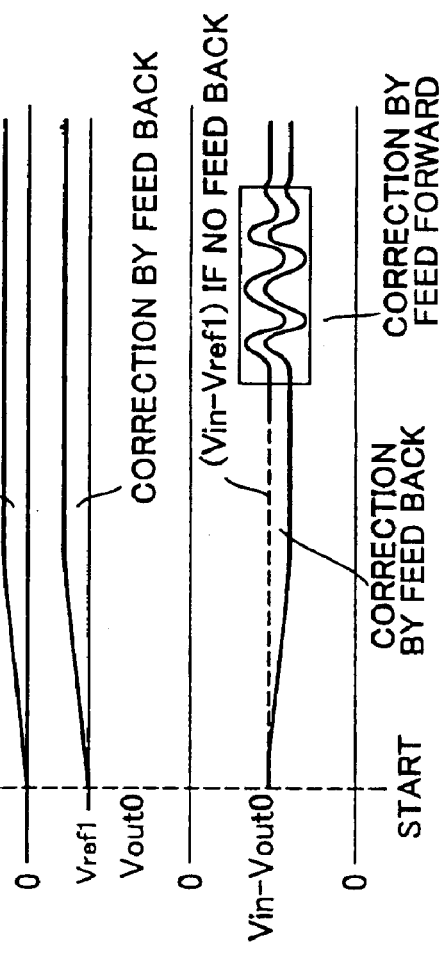

DC-DC CONVERTER WITH FEED-FORWARD AND FEEDBACK CONTROL

FIELD OF THE INVENTION

This invention relates to a control device and method for a DC—DC converter. More particularly, this invention relates to a controlling of a switch in a chopper type DC—DC converter.

BACKGROUND OF THE INVENTION

Conventionally, a technology relating to a feedback control for output voltage in power circuit has been known and one of them is disclosed in Japanese Patent Application Laid-open No. 6-284590.

It has been proposed by installing a high voltage battery (36V) and a low voltage battery (12V) in a vehicle to drive a motor for vehicle driving as well as to drive low voltage electric equipment system. A system that charges the low voltage battery by dropping the voltage of the high voltage battery by using a DC—DC converter when the voltage of low voltage battery drops has been adopted to the vehicle. In this system, the low voltage battery can be charged under a stable condition by feedback controlling the output voltage of the DC—DC converter.

However, when the voltage of the high voltage battery is suddenly varied under an engine starting, the feedback control of the output voltage cannot cope with such sudden voltage change of the high voltage battery. Therefore, the varied voltage may be inputted to the low voltage battery, although intended to input a predetermined voltage.

DISCLOSURE OF THE INVENTION

It is an object of the present invention to provide a device and method which can control an output voltage of a DC—DC converter to a desired voltage even when the input voltage is varied.

According to a first aspect of the invention, a control device for controlling the output voltage of the DC—DC converter by opening/closing control of a switch provided in the DC—DC converter includes a control means for outputting a control signal which controls an opening/closing of the switch with the timings of t1 and t2 to obtain a target output voltage Vout0 from the input voltage Vin of the DC—DC converter and feed forward controls the DC—DC converter by the control means.

According to a second aspect of the invention, a control device for controlling the output voltage of the DC—DC converter by opening/closing control of a pair of switches provided in the chopper type DC—DC converter includes a control means for outputting a pair of control signals which control an opening/closing of the respective switches with the timings of t1 and t2 to obtain a target output voltage Vout0 from the input voltage Vin of the DC—DC converter and feed forward controls the DC—DC converter by the control means. The timings t1 and t2 may be defined by the time satisfying the equation $$(Vin - Vout0) \cdot t1 = Vout0 \cdot t2.$$

According to the invention, not like the conventional control means which feedback controls the output of DC—DC converter, the control means feed forward controls the two switches to restrict the output voltage variation even under the input voltage being varied.

The control means preferably includes a first voltage-current converting means for converting the input voltage Vin and target output voltage Vout0 (Vin−Vout0) to electric current, a second voltage-current converting means for converting the target output voltage Vout0 to electric current, a first switch connected to the first voltage-current converting means, a second switch connected to the second voltage-current converting means, a comparing means connected to the first and second switches for comparing the input voltage with a predetermined maximum limit value and a predetermined minimum limit value, and an opening/closing means for opening/closing control by supplying the output from the comparing means and inverted output to the second and first switches respectively to feed forward controlling of the two switches in the DC—DC converter using the output from the comparing means and the inverted output as control signals.

According to the invention, the control device may further includes a feedback control means to adjust the target output voltage Vout0 by feedback controlling the output voltage of the DC—DC converter.

According to the invention, it is preferable to have a means for shortening the switch closing timings of the two switches in the DC—DC converter by processing the two control signals immediately after the operation of the DC—DC converter.

When using the feedback control means, the output side voltage may temporarily indicate an abnormal value upon initiation of the DC—DC converter operation due to the feedback operation. Accordingly, immediately after the operation begins, the closing timings (ON timings) of the two switches are shortened to limit the current flow amount to avoid the generation of the abnormal value at the output side. This will assure the stable operation. The means for shortening the switch closing timings can be formed to be a circuit structure which uses the terminal voltage change of the condenser generated by the charging/discharging control of the condenser by the control signal and the control voltage signal by combining the condenser, comparator, and control voltage signal.

According to the invention, by adopting the DC—DC converter to the two power source systems of high voltage and low voltage, the input voltage Vin from the high voltage power source is dropped to the level of the target output voltage Vout0 and supplied to the low voltage power source.

According to a third aspect of the invention, a control method for DC—DC converter, that controls an output voltage of the DC—DC converter by open/close control of a switch in the DC—DC converter, includes a step for outputting a control signal for controlling opening/closing the switch with the timings of t1 and t2 to obtain a target output voltage Vout0 from an input voltage Vin of the DC—DC converter, and wherein the DC—DC converter is feed forward controlled.

According to a fourth aspect of the invention, a control method for a chopper type DC—DC converter, that controls an output voltage of the DC—DC converter by open/close control of two switches in the DC—DC converter, includes a step of outputting two control signals for controlling closing the two switches with the timings of t1 and t2 to obtain a target output voltage Vout0 from an input voltage Vin of the DC—DC converter, and wherein the DC—DC converter is feed forward controlled.

BRIEF DESCRIPTION OF THE DRAWINGS

FIG. 5A to FIG. 5E show a timing chart at each portion shown in FIG. 2;

DETAILED DESCRIPTION OF THE PREFERRED EMBODIMENTS

Explaining now each embodiment of the invention with reference to the accompanying drawings, first the case that the voltage of the high voltage battery is dropped by the DC—DC converter and is supplied to the low voltage battery will be explained.

Figure 1:
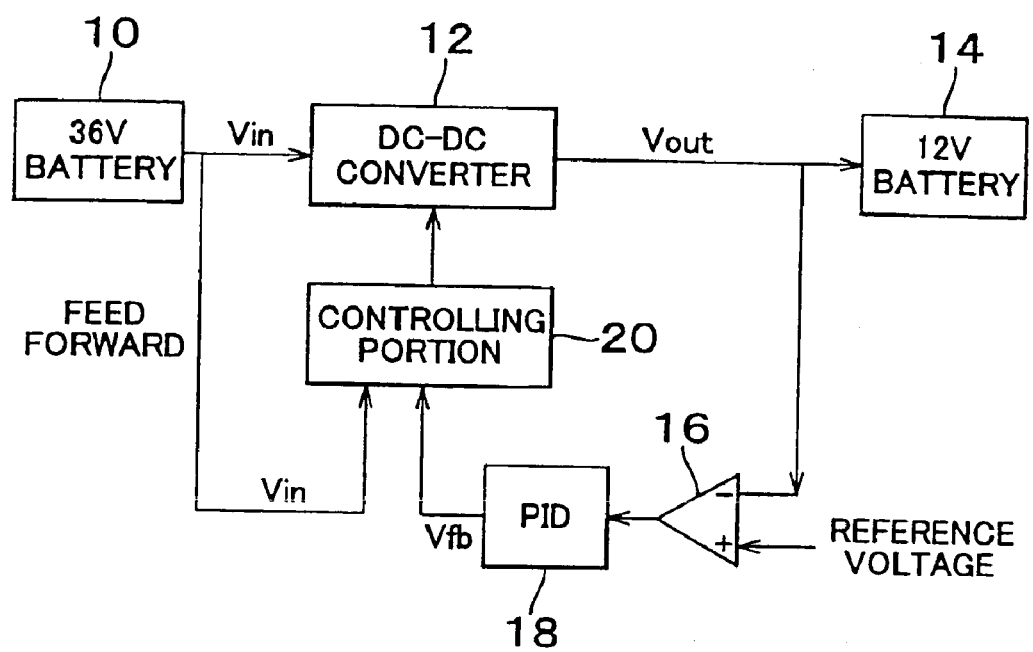
FIG. 1 is a conceptual system view of a first embodiment of the invention.

In FIG. 1 the circuit structure according to the first embodiment of the invention is shown. 36-volt battery 10 and 12-volt battery 14 are provided as a high and a low battery, respectively. A DC—DC converter 12 is connected between the 36-volt battery 10 and the 12-volt battery 14. In this embodiment, the DC—DC converter 12 is a type of chopper DC—DC converter which converts 36-volt to 12-volt by controlling two switches to open and close. The two switches are controlled to open and close by a control signal from a controlling portion 20. The control portion 20 feed forward controls the two switches by inputting a voltage Vin from the 36-V battery 10 and feedback controls by returning a portion of an output voltage Vout of the DC—DC converter 12 via a differential amplifier 16 and PID circuit 18.

Figure 2:
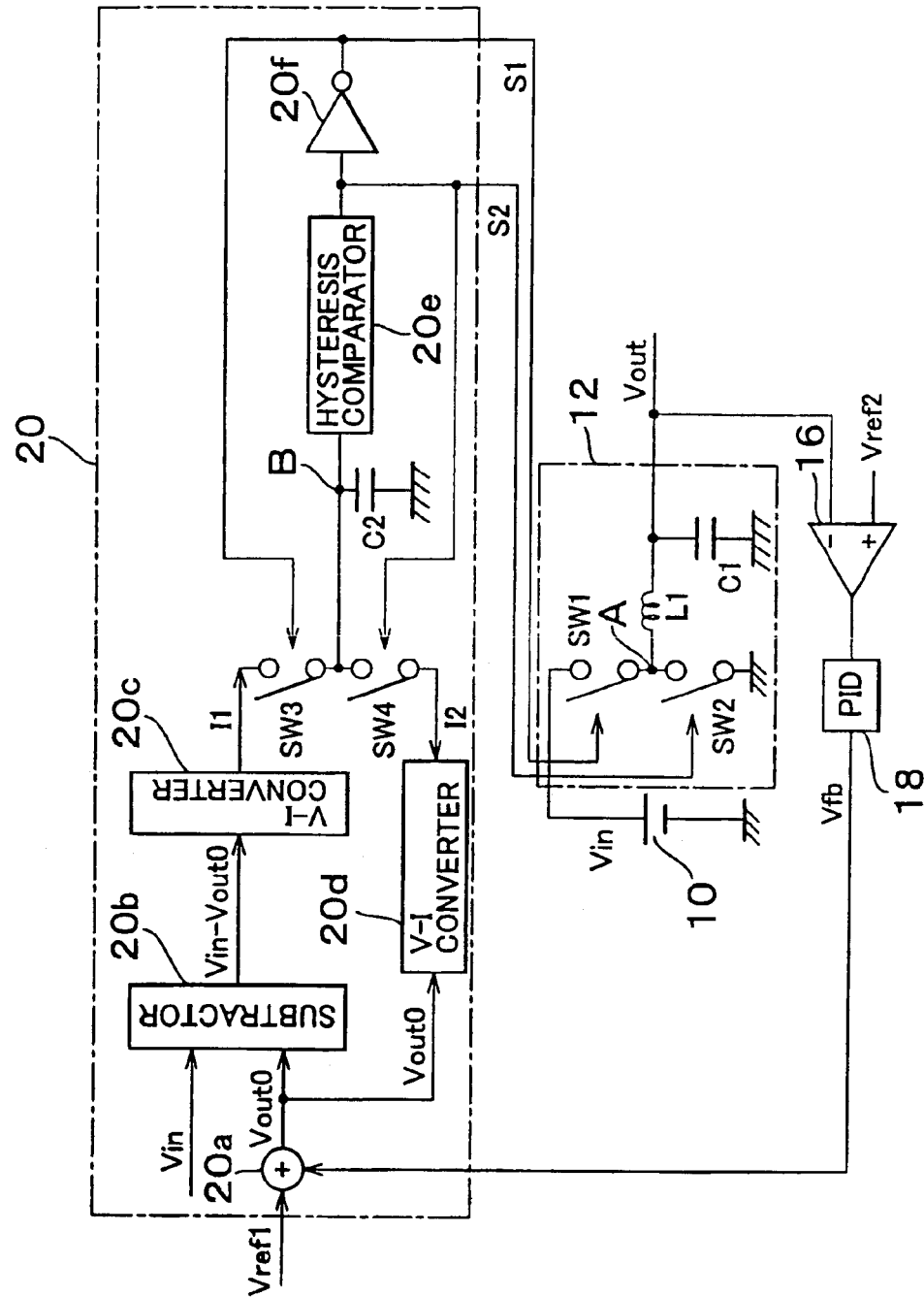
FIG. 2 is a circuit structure implemented by the first embodiment shown in FIG. 1.

In FIG. 2, the detail of the circuit of DC—DC converter 12 and the controlling portion 20 in FIG. 1 is shown. First, the detail of the DC—DC converter 12 is explained. The DC—DC converter 12 includes a pair of switches SW1 and SW2, a coil L1 and a condenser C1. One end of the switch SW1 is connected to the high voltage battery 10 and one end of the switch SW2 is grounded. The other ends of each switch Sw1 and SW2 are connected to the coil L1. The output end of the coil L1 is connected to the condenser C1 and the other end is grounded.

Figure 3:
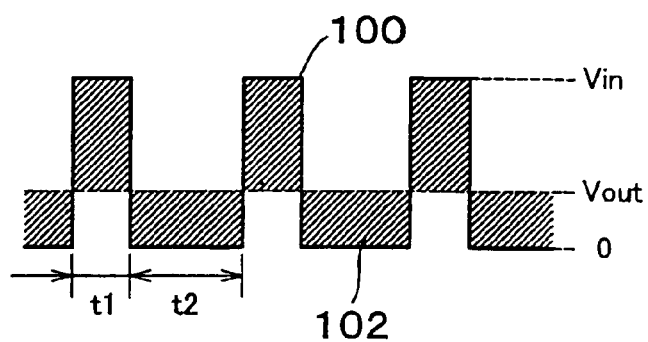
FIG. 3 is an operational explanation view of the DC—DC converter.

In FIG. 3, the voltage at point A of the DC—DC converter 12 is shown when the two switches SW1 and SW2 are controlled to open and close with the timings t1 and t2 respectively. The two switches SW1 and SW2 are alternatively controlled to open and close and the voltage wave form at the point A is formed to be a rectangular wave changing between the approximately zero voltage and the input voltage Vin. The output voltage Vout is given by averaging the coil L1 and the condenser C1. In other words, the area 100 and the area 102 in FIG. 3 become equal and accordingly, in order to make the output voltage Vout of the DC—DC converter 12 to be a desired target voltage Vout0, the following equation is given:

$$(Vin-Vout0) \cdot t1 = Vout0 \cdot t2 \qquad (1)$$

The closing timings t1 and t2, which satisfy the above equation, are given to the switches SW1 and SW2 to obtain the target voltage Vout0. The controlling portion 20 controls the output voltage of the DC—DC converter 12 by supplying the control signal to the DC—DC converter 12.

The controlling portion 20 will be explained with reference to FIG. 2, the controlling portion 20 includes a subtractor 20b calculating the difference between the input voltage Vin from the high voltage battery 10 and the target voltage Vout0, voltaqe-current converter (V-I converter) 20c converting the voltage (Vin−Vout0) from the subtractor 20b into the current, a voltage-current converter (V-I converter) 20d converting the voltage Vout0 into the current, switches SW3, SW4, condenser C2, hysteresis comparator 20e and inverter 20f.

The voltage (Vin−Vout0) from the subtractor 20b is supplied to the V-I converter 20c and converted into the current I1 and supplied to the switch SW3. The other end of the switch SW3 is connected to the condenser C2 and the hysteresis comparator 20e and charged by the condenser C2 by the current I1. The terminal voltage is supplied to hysteresis comparator 20e.

The hysteresis comparator 20e has an upper threshold value and a lower threshold value and outputs zero (0) when the input voltage is increasing from the lower threshold value to the upper threshold value, and outputs one (1) when the input voltage is decreasing to the lower threshold value after the input voltage has exceeded the upper threshold value. A portion of the output from the hysteresis comparator 20e is supplied to the switch SW2 of the DC—DC converter 12 as a control signal S2 and at the same time supplied to the switch SW4 as the open/close signal thereof. The output of the hysteresis comparator 20e is supplied to the switch SW1 of the DC—DC converter 12 through an inverter 20f as a control signal S1 and at the same time supplied to the switch SW3 as the open/close signal thereof.

Figure 4:
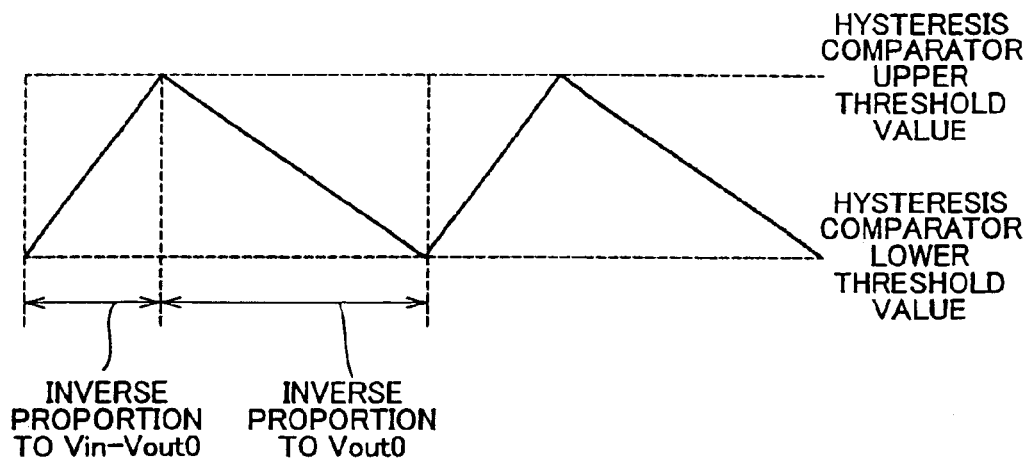
FIG. 4 is an operational explanation view of the hysteresis comparator.

In FIG. 4, the change of input voltage of the hysteresis comparator 20e is shown. In FIG. 4, x axis shows time and y axis shows an input voltage (point B in FIG. 2).

First, the input voltage of the hysteresis comparator 20e is between the upper threshold and lower threshold values and when the output is indicated "0", "0" signal, in other words, open signal is outputted to the switch SW4. On the other hand, an inverted signal "1" is outputted from the inverter 20f and "1" signal, in other words, close signal (ON signal) is outputted to the switch SW3 to charge the condenser C2 by the current I1 from the V-I converter 20c. During this operation, the control signal S1 receives "1" signal (close signal) same as the "1" signal in the switch SW3. In accordance with the charging of the condenser C2, the terminal voltage increases to reach the upper threshold value. The time reaching the upper threshold value is inverse proportional to the current I1 value, in other words, to the voltage (Vin−Vout0). When the input voltage exceeds the threshold value, the output of the hysteresis comparator 20e is changed from "0" to "1" signal and accordingly, the "1" signal (close signal) is inputted to the switch SW4 to close the switch SW4. The control signal S2 receives "1" signal (close signal). Since the output signal of the inverter 20f is changed from the "1" to "0" signal, the switch SW3 receives the "0" signal (open signal) to open the switch SW3. The condenser C2 is discharged and the current I2 flows through the switch SW4 defined by the output voltage Vout0 and the V-I converter 20d for inverting the output voltage Vout0. The input voltage of the hysteresis comparator 20e drops to reach the lower threshold value. The time to reach the lower threshold value is inverse proportional to the discharging current I2, in other words, to the target voltage Vout0. When the input voltage of the hysteresis comparator 20e drops below the lower threshold value, the output of the hysteresis comparator 20e is changed from the "1" to "0" signal to open the switch SW4 and close the switch SW3 and the voltage is changing similarly thereafter.

As described, the time from the lower threshold value to reach the upper threshold value, in other words, the time for the control signal S1 being "1" signal (close signal) is inverse proportional to the value (Vin−Vout0) and the time from the upper threshold value to reach the lower threshold value, in other words, the time for the control signal S2 being "1" signal (close signal) is inverse proportional to the value Vout0. The switches SW1 and SW2 are controlled to close with the time inverse proportion to the values (Vin−Vout0), and Vout0, respectively. Now referring back to the equation (1), the timings t1 and t2 that satisfy the equation are the time inverse proportional to the values (Vin−Vout0) and Vout0, respectively the controlling portion 20 eventually outputs control signals S1 and S2 that satisfy the equation (1) to the respective switches SW1 and SW2 of the DC—DC converter 12. Thus the output voltage of the DC—DC converter 12 can be controlled to the target voltage Vout0.

Thus, the controlling portion 20 can feed forward control the output voltage of the DC—DC converter 12. According to this feed forward controlling method, even when the output voltage of the 36-V battery 10 as a high voltage battery is changed, the transmitting of such change of the voltage to the low voltage battery 12 is suppressed.

It is still difficult to obtain accurately and in short time the output voltage of the DC—DC converter 12 to be controlled to the target voltage Vout0 by the feed forward control by the controlling portion 20 only. According to this embodiment, therefore, the feed back control is applied in addition to the feed forward control by the controlling portion 20.

As described above, the control signals S1 and S2 are generated by inputting the value (Vin−Vout0) and Vout0 by the controlling portion 20, the target voltage Vout0 is generated by adding a reference voltage Vref1 and feed back voltage Vfb by an adder 20a. This will be indicated as Vout0=Vref1+Vfb. The value Vref1 is fixed to the target voltage of 12V. On the other hand, the value Vfb is defined through a differential amplifier 16 and a PID circuit 18 from the output voltage Vout of the DC—DC converter 12. The value Vref2 is fixed to the target voltage of 12V similar to the value Vref1. When the difference between the output voltage Vout and the value Vref2 occurs, the value Vfb by the difference therebetween is generated and the value Vout0 is corrected. On the other hand, if the value Vin is changed, keeping the corrected amount Vfb by the feed back control, the value (Vin−Vvoiut0) is changed to function as a feed forward control to keep the output voltage Vout to be constant.

FIGS. 5A through 5E show the timing chart according to the circuit structure of the embodiment. FIG. 5A shows the value Vin, in other words, the time change of the voltage from the 36-V battery 10. This voltage is supplied to the switch SW1 of the DC—DC converter 12 and also supplied to the subtractor 20b of the controlling portion 20. Normally, the value Vin is set to be a constant value of 36V, but may be changeable in response to the engine cranking of the vehicle. In FIG. 5A, the voltage change is referenced as numeral 104. FIG. 5B shows a time change of the output voltage Vout of the DC—DC converter 12. The high voltage 36V is dropped to be 12V by alternately switching the switches SW1 and SW2. The value immediately after the starting is 0V and the difference Vfb is generated due to the difference in value with the reference value Vref2 and the value Vout0 is corrected. The feed forward control is performed with the value of Vout0 to converge to 12V. FIG. 5C shows a time change of the value Vfb and this value Vfb contributes to feedback controlling. FIG. 5D shows a time change of the value Vout0 and this value is defined by the total of the values Vref1 and Vfb. When the output voltage is different from the value Vref1, the difference is fed back as Vfb and corrected. FIG. 5E shows a time change of the value (Vin−Vout0) and comparatively shows the feed back control of the embodiment and no feedback control being performed (chain line in the drawing) When the feed back control is performed, the feed back voltage Vfb corrects the value Vout0 and accordingly, the value (Vin−Vout0) becomes smaller than the case of no feed back control by the correction amount. The change 104 of the value Vin will not influence on the value Vout because the change of the value Vin−Vout0 is absorbed by the feed forward control as the duty change of the switches Sw1 and SW2.

Accordingly, by the combination of the feed forward and feed back controls, even when the voltage change in 36-V battery 10 is generated, the change can be suppressed to stably output the target value of 12V from the DC—DC converter 12.

Figure 6:
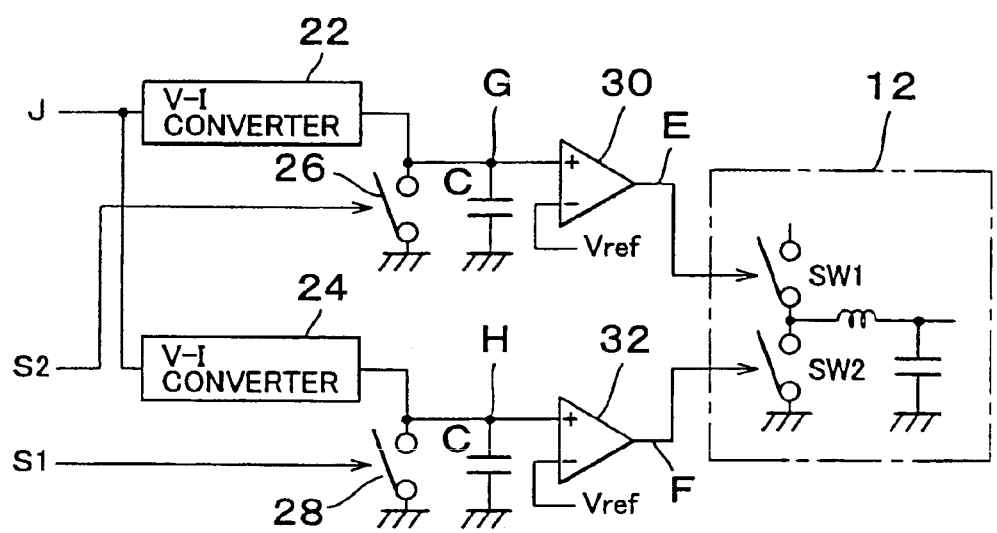
FIG. 6 is a main circuit structure of a second embodiment according to the invention.
Figure 7:
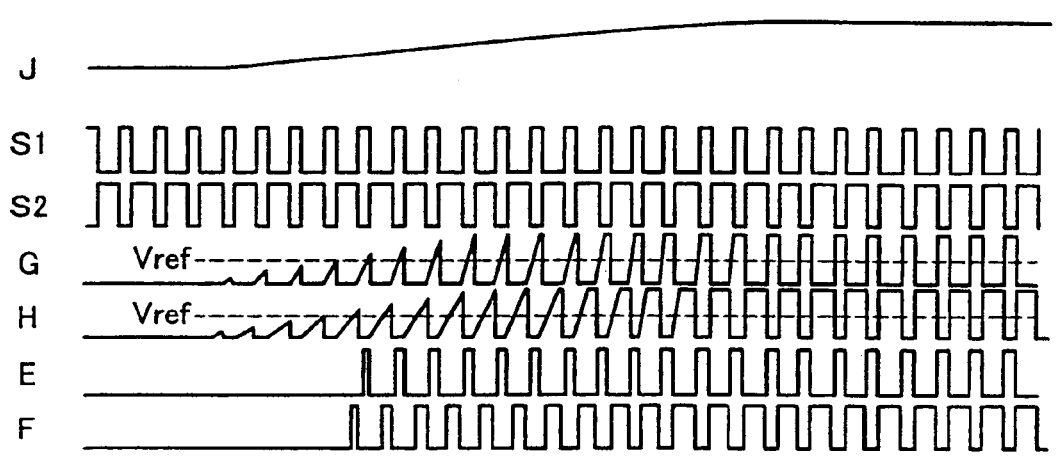
FIG. 7 is a timing chart of each portion shown in FIG. 6.

Next, referring to the second embodiment of the invention with reference to the attached drawings of FIGS. 6 and 7. The same components and structure as the first embodiment are numbered as the same numerals and detail explanation thereof will be omitted.

According to the first embodiment, the chopper type DC—DC converter 12 is used and upon starting, if the initial value of the feedback system is dispersed (largely deviated to either positive or negative side), excessive voltage may be generated at the output Vout and voltage increase may be generated to increase the target voltage 12V even when intended to drop the voltage from 36V to 12V.

FIG. 6 shows a circuit structure to prevent such unintended conditions. The function of the circuit is to prevent the excess voltage and increase of the voltage by restricting the electric current at the starting (soft starting) by gradually increasing the closing timings of the switches SW1 and SW2.

The soft start circuit which shortens the ON time of the switches Sw1 and Sw2 Immediately after the starting of the operation is formed by the voltage-current converters 22 and 24, switches 26 and 28, two condensers C, and comparators 30 and 32. The soft start circuit is provided between the controlling portion 20 and the DC—DC converter 12 as shown in FIG. 2 and the control signals S1 and S2 from the controlling portion 20 is supplied to the switches 28 and 26 as an open/close signal for each switch. The control voltage J defining the gradual timing from the starting (the voltage J is for example, generated by the ECU as a trigger of the start detected by the ECU) is supplied to the V-I converters 22 and 24. The control voltage J indicates a change of gradual increase of the voltage from the start to a predetermined value and the time for executing the soft starting is determined by the time to reach the predetermined value. The V-I converters 22, 24 are connected to each one end of the switches 26, 28. Each the other end of the switches 26, 28 is grounded. The each one end of the switches 26, 28 is connected to condensers C and each non inverse input terminal of the comparators 30, 32, respectively.

Each inverse input terminal of the comparators 30, 32 is inputted the reference voltage Vref. The outputs of the respective comparators 30, 32 are supplied to the two switches SW1 and SW2 as their open/close signals.

FIG. 7 shows a timing chart of the voltage for each portion. The control voltage J is outputted from the ECU (not shown) at the time of starting and supplied to the V-I converters 22, 24. The control signals S1 and S2 are outputted from the controlling portion 20 by the feed forward control (in more accurately, the combination of the feed forward and feed back controls). The control signals S1 and S2 are alternately turned ON/OFF. The time of ON for signal S1, in other words, switch close time is inverse proportional to the value (Vin−Vout0) and the time of ON for signal S2, in other words, switch close time is inverse proportional to the value Vout0. Since the signal S1 is supplied to the switch 28 and the signal S2 is supplied to the switch 26, the switch 28 is ON and switch 26 is OFF when the signal S1 is ON and the switch 26 is ON and switch 28 is OFF when the signal S2 is ON.

When the switch 26 is OFF and the switch 28 is ON (in case of signal S2 being OFF), the condenser C is charged by the current from the V-I converter 22 and the voltage at the non inverse input terminal of the comparator 30 increases. When the switch 26 is turned ON from the OFF condition (signal S2 becomes ON from OFF), the condenser C is discharged and the voltage at the non inverse input terminal of the comparator 30 decreases. Accordingly, the voltage at point G which is the voltage at the non inverse input terminal of the comparator 30 increases and decreases with the timing of the signal S2 being OFF as shown in FIG. 7 The increase of the voltage at the point G depends on the control voltage J. When the control voltage J is low (immediately after the starting operation), the voltage at the point G is equal to or less than the value Vref. When the control voltage J increases, the voltage at the point G increases accordingly to exceed the reference voltage Vref. Then the output of the comparator 30 changes from "0" to "1" (close signal or ON signal). The output of the comparator 30 is the time change at the point E of the drawings and outputs close signal (ON signal) when the value exceeds the reference value Vref. The voltage at the point G increases when the signal S2 is OFF, in other words, the signal S1 is ON and exceeds the reference value Vref when the control voltage J is equal to or more than a predetermined value, the value J exceeds the reference value Vref and the voltage at point E, in other words, the output signal to be supplied to the switch SW1 of the DC—DC converter 12 becomes ON with the timing of the signal S1 being ON and with the timing of control by the control voltage J. Accordingly, the ON time of the signal S1 can be shortened.

When the switch 28 is OFF and the switch 26 is ON (in case of signal S1 being OFF), the other condenser C is charged by the current from the V-I converter 24 and the voltage at the non inverse input terminal of the comparator 32 increases. When the switch 28 is turned ON from the OFF condition (signal S1 becomes ON from OFF), the condenser C is discharged and the voltage at the non inverse input terminal of the comparator 32 decreases. Accordingly, the voltage at point H which is the voltage at the non inverse input terminal of the comparator 32 increases, and decreases with the timing of the signal S1 being OFF as shown in FIG. 7 The increase of the voltage at the point H depends on the control voltage J. When the control voltage J is low (immediately after the starting operation), the voltage at the point H is equal to or less than the value Vref. When the control voltage J increases, the voltage at the point H increases accordingly to exceed the reference voltage Vref. Then the output of the comparator 32 changes from "0" to "1" (close signal or ON signal). The output of the comparator 32 is the time change at the point F of the drawings and outputs close signal (ON signal) when the value exceeds the reference value Vref. The voltage at the point H increases when the signal S1 is OFF, in other words, the signal S2 is ON and exceeds the reference value Vref when the control voltage J is equal to or more than a predetermined value, the value J exceeds the reference value Vref and the voltage at point F, in other words, the output signal to be supplied to the switch SW2 of the DC—DC converter 12 becomes ON with the timing of the signal S2 being ON and with the timing of control by the control voltage J. Accordingly, the ON time of the signal S2 can be shortened.

Thus the time to alternately control the closing of the switches Sw1 and SW2 (ON control) can be shortened at the time of starting and gradually increase the ON time so that the electric current amount at the starting can be restricted.

The first and second embodiments have been explained to charge 12-V battery with the application of 36-V battery. It should be noted however, the invention is not limited to the embodiments above and the invention can be applicable to any system using DC—DC converter.

Next, the third embodiment of the invention will be explained with reference to FIG. 8. The system of the aforementioned embodiments uses two switches SW1 and SW2 of the DC—DC converter 12, but the invention is not limited to such system but to be applicable to the DC—DC converter with one switch. In this case the timing t1 corresponds to the closing timing of the single switch and the timing of t2 corresponds to the opening timing of the switch.

Figure 8:
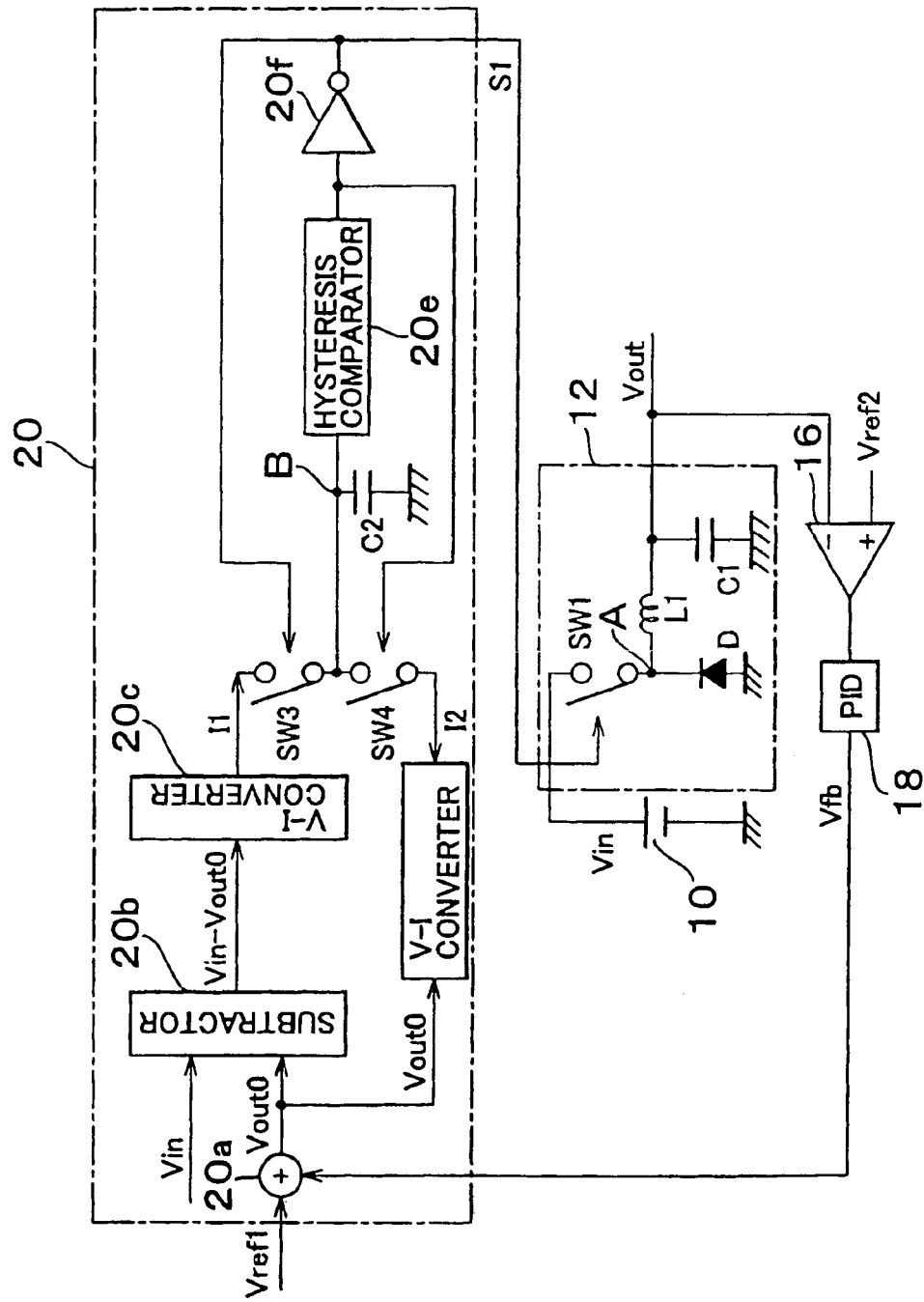
FIG. 8 is a main circuit structure of a third embodiment according to the invention.

FIG. 8 shows a circuit structure with the DC—DC converter 12 having a single switch. The difference with the circuit in FIG. 2 is that the switch SW2 in FIG. 2 is substituted by a diode D. In this case, the switch SW1 is ON for the timing of t1 and is OFF for the timing of t2 to operate the system similar to FIG. 2. When the switch SW1 becomes OFF from the ON condition, the current continuously flows through coil L1 in the right direction as viewed in FIG. 8 to turn the diode D ON to function as the switch SW2 in FIG. 2.

Next, the fourth embodiment of the invention will be explained with reference to FIGS. 9 and 10. The chopper type DC—DC converter 12 is used in the previous embodiments, but the invention is not limited to the chopper type and any different type, for example, forward type DC—DC converter can be applicable to this invention.

Figure 9:
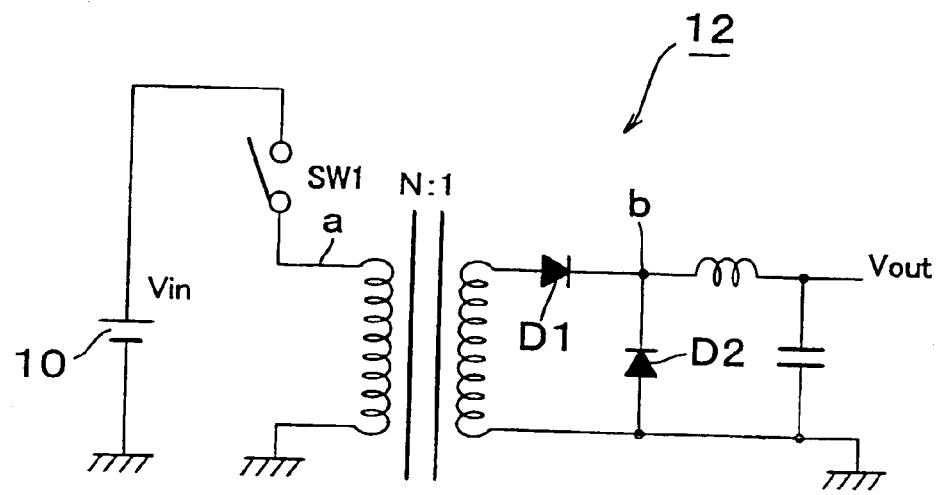
FIG. 9 is a DC—DC converter circuit structure of a fourth embodiment of the invention.

In FIG. 9, a forward type DC—DC converter circuit is shown. The DC—DC converter 12 is formed by one single switch SW1, transformer, diodes D1 and D2, coil, and condenser. One end of the switch SW1 is connected to a high voltage battery and the other end is connected to the primary side of the transformer. The wiring of the transformer is N:1 and diode D1, diode D2, coil, and condenser are connected to the secondary side of the transformer.

According to this structure, the voltage of one Nth of the primary side is outputted at the secondary side. When the switch SW1 is ON for the timing of t1 to increase the voltage at the secondary side, the diode D1 is turned ON to apply the voltage of Vin/N to the coil. When the switch S1 becomes OFF from the ON condition (OFF timing: t2) the voltage at the secondary side is overshoot to the negative side, but the diode D1 becomes OFF and the current flowing through the coil continues to flow to turn the diode D2 ON so that the current path can be secured. The voltage at the diode side of the coil is approximately zero (0).

Figure 10A:
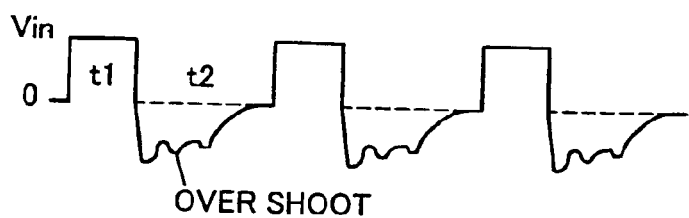
FIG. 10A to FIG. 10B show a timing chart at each portion shown in FIG. 9.
Figure 10B:

FIGS. 10A and 10B show the timing chart of the forward type DC—DC converter 12 shown in FIG. 9. FIG. 10A shows a wave form at portion "a" in FIG. 9 and FIG. 10B shows a wave form at portion "b" in FIG. 9. As shown in FIG. 10A, when the switch SW1 is ON for the timing of t1, the voltage of the transformer at primary side is Vin. When the switch SW1 becomes OFF, the voltage is overshoot to be converged to be zero. On the other hand, as shown in FIG. 10B, the voltage Vout at the secondary side of the transformer becomes Vin/N for the timing of t1 and becomes zero for the timing of t2. Accordingly, the timings of t1 and t2 are set to satisfy the following equation:

$$(Vin/N - Vout0) \cdot t1 = Vout0 \cdot t2$$

Figure 11:
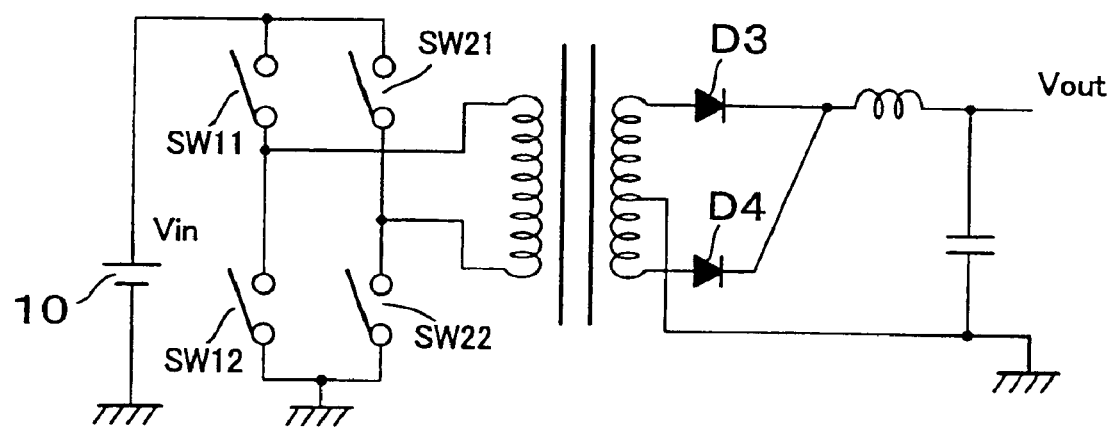
FIG. 11 is a DC—DC converter circuit structure of a fifth embodiment of the invention.

Next, the fifth embodiment will be explained with reference to FIG. 11. A push pull type DC—DC converter may be used in this embodiment as a DC—DC converter of the invention. FIG. 11 shows a push pull type DC—DC converter circuit structure. The DC—DC converter 12 is formed by four switches SW11, SW21, SW12, and SW22, transformer, diodes D3 and D4, coil and condenser.

In this structure, the following cycle is repeated:
(1) turn ON the switches SW11 and SW22;
(2) turn OFF all the switches SW11, SW12, SW21, and SW22;
(3) turn ON the switches SW12 and SW21; and
(4) turn OFF all the switches SW11, SW12, SW21, and SW22.

Vin/N voltage is generated at the secondary side of the transformer under the step (1) operation to turn the diode D3 ON. Under the steps (2) and (4), it is ideal not to generate any voltage at the secondary side, but a voltage of inductance is generated. Under the step (3), the voltage of Vin/N is generated at the secondary side of the transformer to turn the diode D4 ON.

Accordingly, the ON timing of t1 under the steps (1) and (3) and OFF timing of t2 under the steps (2) and (4) are calculated by the following equation:

$$(Vin/N - Vout0) \cdot t1 = Vout0 \cdot t2$$

According to each embodiment of the present invention, the output voltage of the DC—DC converter can be controlled to be a desired voltage even when the input voltage is changed.

What is claimed is:

1. A control device for DC—DC converter, that controls an output voltage of the DC—DC converter by open/close control of a switch in the DC—DC converter, comprising:

a control means for outputting a control signal for controlling opening/closing the switch with the timings of t1 and t2 to obtain a target output voltage Vout0 from an input voltage Vin of the DC—DC converter, wherein the DC—DC converter is feed forward controlled by the control means, and wherein the timings t1 and t2 are defined relative to the input voltage Vin and the target output voltage Vout0 by the equation:

$$(Vin - Vout0) \cdot t1 = Vout0 \cdot t2.$$

2. A control device according to claim 1, wherein the control means includes:

a first voltage-current converting means for converting the voltage to the current;

a second voltage-current converting means for converting the voltage Vout0 to the current;

a first switch connected to the first voltage-current converting means;

a second switch connected to the second voltage-current converting means;

a comparing means connected to the first and second switches for comparing a predetermined upper limit value and a predetermined lower limit value with the input voltage; and an open/close means for supplying the output and inverse output from the comparing means to the second and first switches respectively, and wherein the two switches in the DC—DC converter are feed forward controlled by using the output and inverse output from the comparing means as the control signals.

3. A control device according to claim 2, further comprising a condenser connected to an upstream side of the comparing means.

4. A control device according to claim 1, further comprising a feed back control means for adjusting the target output voltage Vout0 by feed back controlling the output voltage of the DC—DC converter.

5. A control device according to claim 1, further comprising a time shortening means for shortening the close timing of the switch in the DC—DC converter by processing the control signals immediately after the start of the DC—DC converter.

6. A control device according to claim 1, wherein the DC—DC converter supplies the input voltage Vin from a high voltage power source to a low voltage power source by dropping to the target output voltage Vout0.

7. A control device for a chopper type DC—DC converter, that controls an output voltage of the DC—DC converter by open/close control of two switches in the DC—DC converter, comprising:

a control means for outputting two control signals for controlling closing the two switches with the timings of t1 and t2 to obtain a target output voltage Vout0 from an input voltage Vin of the DC—DC converter, wherein the DC—DC converter is feed forward controlled by the control means, and wherein the timings t1 and t2 are defined relative to the input voltage Vin and the target output voltage Vout0 by the equation:

$$(Vin - Vout0) \cdot t1 = Vout0 \cdot t2.$$

8. A control device according to claim 7, wherein the control means includes:

a first voltage-current converting means for converting the voltage to the current;

a second voltage-current converting means for converting the voltage Vout0 to the current;

a first switch connected to the first voltage-current converting means;

a second switch connected to the second voltage-current converting means;

a comparing means connected to the first and second switches for comparing a predetermined upper limit value and a predetermined lower limit value with the input voltage; and an open/close means for supplying the output and inverse output from the comparing means to the second and first switches respectively, and wherein the two switches in the DC—DC converter are feed forward controlled by using the output and inverse output from the comparing means as the control signals.

9. A control device according to claim 8, further comprising a condenser connected to an upstream side of the comparing means.

10. A control device according to claim 7, further comprising a feed back control means for adjusting the target output voltage Vout0 by feed back controlling the output voltage of the DC—DC converter.

11. A control device according to claim 7, further comprising a time shortening means for shortening the close timing of the switch in the DC—DC converter by processing the control signals immediately after the start of the DC—DC converter.

12. A control device according to claim 7, wherein the DC—DC converter supplies the input voltage Vin from a high voltage power source to a low voltage power source by dropping to the target output voltage Vout0.

13. A control method for controlling a DC—DC converter that controls an output voltage of the DC—DC converter by open/close control of a switch in the DC—DC converter, comprising:

outputting a control signal for controlling opening/closing the switch with the timings t1 and t2 to obtain a target output voltage Vout0 from an input voltage Vin of the DC—DC converter, wherein the DC—DC converter is feed forward controlled, and wherein the timings t1 and t2 are defined relative to the input voltage Vin and the target output voltage Vout0 by the equation:

$$(Vin-Vout0) \cdot t1 = Vout0 \cdot t2.$$

14. A control method according to claim 13, further comprising:

adjusting the target output voltage Vout0 by feed back controlling the output voltage of the DC—DC converter.

15. A control method according to claim 13, further comprising:

shortening the close timing of the switch in the DC—DC converter by processing the control signals immediately after the start of the DC—DC converter.

16. A control method according to claim 13, wherein the DC—DC converter supplies the input voltage Vin from a high voltage power source to a low voltage power source by dropping to the target output voltage Vout0.

17. A control method for a chopper type DC—DC converter, that controls an output voltage of the DC—DC converter by open/close control of two switches in the DC—DC converter, comprising:

outputting two control signals for controlling closing the two switches with the timings of t1 and t2 to obtain a target output voltage Vout0 from an input voltage Vin of the DC—DC converter, and wherein the DC—DC converter is feed forward controlled, and wherein the timings t1 and t2 are defined relative to the input voltage Vin and the target output voltage Vout0 by the equation:

$$(Vin-Vout0) \cdot t1 = Vout0 \cdot t2.$$

18. A control method according to claim 17, further comprising:

adjusting the target output voltage Vout0 by feed back controlling the output voltage of the DC—DC converter.

19. A control method according to claim 17, further comprising:

shortening the close timing of the switch in the DC—DC converter by processing the control signals immediately after the start of the DC—DC converter.

20. A control method according to claim 17, wherein the DC—DC converter supplies the input voltage Vin from a high voltage power source to a low voltage power source by dropping to the target output voltage Vout0.

21. A control device for DC—DC converter, that controls an output voltage of the DC—DC converter by open/close control of a switch in the DC—DC converter, comprising:

a controller that outputs a control signal for controlling opening/closing the switch with the timings of t1 and t2 to obtain a target output voltage Vout0 from an input voltage Vin of the DC—DC converter, wherein the DC—DC converter is feed forward controlled by the controller, and wherein the timings t1 and t2 are defined relative to the input voltage Vin and the target output voltage Vout0 by the equation:

$$(Vin-Vout0) \cdot t1 = Vout0 \cdot t2.$$

22. A control device according to claim 21, wherein the controller includes:

a first voltage-current converter that converts the voltage (Vin−Vout0) to the current;

a second voltage-current converter that converts the voltage Vout0 to the current;

a first switch connected to the first voltage-current converter;

a second switch connected to the second voltage-current converter;

a comparator connected to the first and second switches, and that compares a predetermined upper limit value and a predetermined lower limit value with the input voltage; and an open/close device that supplies the output and inverse output from the comparator to the second and first switches respectively, and wherein the two switches in the DC—DC converter are feed forward controlled by using the output and inverse output from the comparator as the control signals.

23. A control device according to claim 22, further comprising a condenser connected to an upstream side of the comparator.

24. A control device according to claim 21, further comprising a feed back control device that adjusts the target output voltage Vout0 by feed back controlling the output voltage of the DC—DC converter.

25. A control device according to claim 21, further comprising a time shortening device that shortens the close timing of the switch in the DC—DC converter by processing the control signals immediately after the start of the DC—DC converter.

26. A control device according to claim 21, wherein the DC—DC converter supplies the input voltage Vin from a high voltage power source to a low voltage power source by dropping to the target output voltage Vout0.

27. A control device for a chopper type DC—DC converter, that controls an output voltage of the DC—DC converter by open/close control of two switches in the DC—DC converter, comprising:

a controller that outputs two control signals for controlling closing the two switches with the timings of t1 and t2 to obtain a target output voltage Vout0 from an input voltage Vin of the DC—DC converter, wherein the DC—DC converter is feed forward controlled by the controller, and wherein the timings t1 and t2 are defined relative to the input voltage Vin and the target output voltage Vout0 by the equation:

$$(Vin-Vout0) \cdot t1 = Vout0 \cdot t2.$$

28. A control device according to claim 27, wherein the controller includes:

a first voltage-current converter that converts the voltage (Vin−Vout0) to the current;

a second voltage-current converter that converts the voltage Vout0 to the current;

a first switch connected to the first voltage-current converter;

a second switch connected to the second voltage-current converter;

a comparator connected to the first and second switches, and that compares a predetermined upper limit value and a predetermined lower limit value with the input voltage; and an open/close device that supplies the output and inverse output from the comparator to the second and first switches respectively, and wherein the two switches in the DC—DC converter are feed forward controlled by using the output and inverse output from the comparator as the control signals.

29. A control device according to claim 28, further comprising a condenser connected to an upstream side of the comparator.

30. A control device according to claim 27, further comprising a feed back control device that adjusts the target output voltage Vout0 by feed back controlling the output voltage of the DC—DC converter.

31. A control device according to claim 27, further comprising a time shortening device that shortens the close timing of the switch in the DC—DC converter by processing the control signals immediately after the start of the DC—DC converter.

32. A control device according to claim 27, wherein the DC—DC converter supplies the input voltage Vin from a high voltage power source to a low voltage power source by dropping to the target output voltage Vout0.

33. A control device for DC—DC converter, that controls an output voltage of the DC—DC converter by open/close control of a switch in the DC—DC converter, comprising:

a control means for outputting a control signal for controlling opening/closing the switch with the timings of t1 and t2 to obtain a target output voltage Vout0 from an input voltage Vin of the DC—DC converter, wherein the DC—DC converter is feed forward controlled by the control means, and wherein the DC—DC converter includes a transformer whose wiring is N:1, the timings t1 and t2 are defined relative to the input voltage Vin and the target output voltage Vout0 by the equation $$(Vin/N - Vout0) \cdot t1 = Vout0 \cdot t2.$$

34. A control device according to claim 33, wherein the control means includes:

a first voltage-current converting means for converting the voltage to the current;

a second voltage-current converting means for converting the voltage Vout0 to the current;

a first switch connected to the first voltage-current converting means;

a second switch connected to the second voltage-current converting means;

a comparing means connected to the first and second switches for comparing a predetermined upper limit value and a predetermined lower limit value with the input voltage; and an open/close means for supplying the output and inverse output from the comparing means to the second and first switches respectively, and wherein the two switches in the DC—DC converter are feed forward controlled by using the output and inverse output from the comparing means as the control signals.

35. A control device according to claim 34, further comprising a condenser connected to an upstream side of the comparing means.

36. A control device according to claim 33, further comprising a feed back control means for adjusting the target output voltage Vout0 by feed back controlling the output voltage of the DC—DC converter.

37. A control device according to claim 33, further comprising a time shortening means for shortening the close timing of the switch in the DC—DC converter by processing the control signals immediately after the start of the DC—DC converter.

38. A control device according to claim 33, wherein the DC—DC converter supplies the input voltage Vin from a high voltage power source to a low voltage power source by dropping to the target output voltage Vout0.

39. A control device for a chopper type DC—DC converter, that controls an output voltage of the DC—DC converter by open/close control of two switches in the DC—DC converter, comprising:

a control means for outputting two control signals for controlling closing the two switches with the timings of t1 and t2 to obtain a target output voltage Vout0 from an input voltage Vin of the DC—DC converter, wherein the DC—DC converter is feed forward controlled by the control means, and wherein the DC—DC converter includes a transformer whose wiring is N:1, the timings t1 and t2 are defined relative to the input voltage Vin and the target output voltage Vout0 by the equation $$(Vin/N - Vout0) \cdot t1 = Vout0 \cdot t2.$$

40. A control device according to claim 39, wherein the control means includes:

a first voltage-current converting means for converting the voltage to the current;

a second voltage-current converting means for converting the voltage Vout0 to the current;

a first switch connected to the first voltage-current converting means;

a second switch connected to the second voltage-current converting means;

a comparing means connected to the first and second switches for comparing a predetermined upper limit value and a predetermined lower limit value with the input voltage; and an open/close means for supplying the output and inverse output from the comparing means to the second and first switches respectively, and wherein the two switches in the DC—DC converter are feed forward controlled by using the output and inverse output from the comparing means as the control signals.

41. A control device according to claim 40, further comprising a condenser connected to an upstream side of the comparing means.

42. A control device according to claim 39, further comprising a feed back control means for adjusting the target output voltage Vout0 by feed back controlling the output voltage of the DC—DC converter.

43. A control device according to claim 39, further comprising a time shortening means for shortening the close timing of the switch in the DC—DC converter by processing the control signals immediately after the start of the DC—DC converter.

44. A control device according to claim 39, wherein the DC—DC converter supplies the input voltage Vin from a high voltage power source to a low voltage power source by dropping to the target output voltage Vout0.

45. A control method for controlling a DC—DC converter that controls an output voltage of the DC—DC converter by open/close control of a switch in the DC—DC converter, comprising:

outputting a control signal for controlling opening/closing the switch with the timings t1 and t2 to obtain a target output voltage Vout0 from an input voltage Vin of the DC—DC converter, wherein the DC—DC converter is feed forward controlled, and wherein the DC—DC converter includes a transformer whose wiring is N:1, the timings t1 and t2 are defined relative to the input voltage Vin and the target output voltage Vout0 by the equation $$(Vin/N - Vout0) \cdot t1 = Vout0 \cdot t2.$$

46. A control method according to claim 45, further comprising:

adjusting the target output voltage Vout0 by feed back controlling the output voltage of the DC—DC converter.

47. A control method according to claim 45, further comprising:

shortening the close timing of the switch in the DC—DC converter by processing the control signals immediately after the start of the DC—DC converter.

48. A control method according to claim 45, wherein the DC—DC converter supplies the input voltage Vin from a high voltage power source to a low voltage power source by dropping to the target output voltage Vout0.

49. A control method for a chopper type DC—DC converter, that controls an output voltage of the DC—DC converter by open/close control of two switches in the DC—DC converter, comprising:

outputting two control signals for controlling closing the two switches with the timings of t1 and t2 to obtain a target output voltage Vout0 from an input voltage Vin of the DC—DC converter, wherein the DC—DC converter is feed forward controlled, and wherein the DC—DC converter includes a transformer whose wiring is N:1, the timings t1 and t2 are defined relative to the input voltage Vin and the target output voltage Vout0 by the equation $$(Vin/N - Vout0) \cdot t1 = Vout0 \cdot t2.$$

50. A control method according to claim 49, further comprising:

adjusting the target output voltage Vout0 by feed back controlling the output voltage of the DC—DC converter.

51. A control method according to claim 49, further comprising:

shortening the close timing of the switch in the DC—DC converter by processing the control signals immediately after the start of the DC—DC converter.

52. A control method according to claim 49, wherein the DC—DC converter supplies the input voltage Vin from a high voltage power source to a low voltage power source by dropping to the target output voltage Vout0.

53. A control device for DC—DC converter, that controls an output voltage of the DC—DC converter by open/close control of a switch in the DC—DC converter, comprising:

a controller that outputs a control signal for controlling opening/closing the switch with the timings of t1 and t2 to obtain a target output voltage Vout0 from an input voltage Vin of the DC—DC converter, wherein the DC—DC converter is feed forward controlled by the controller, and wherein the DC—DC converter includes a transformer whose wiring is N:1, the timings t1 and t2 are defined relative to the input voltage Vin and the target output voltage Vout0 by the equation $$(Vin/N - Vout0) \cdot t1 = Vout0 \cdot t2.$$

54. A control device according to claim 53, wherein the controller includes:

a first voltage-current converter that converts the voltage (Vin−Vout0) to the current;

a second voltage-current converter that converts the voltage Vout0 to the current;

a first switch connected to the first voltage-current converter;

a second switch connected to the second voltage-current converter;

a comparator connected to the first and second switches, and that compares a predetermined upper limit value and a predetermined lower limit value with the input voltage; and an open/close device that supplies the output and inverse output from the comparator to the second and first switches respectively, and wherein the two switches in the DC—DC converter are feed forward controlled by using the output and inverse output from the comparator as the control signals.

55. A control device according to claim 54, further comprising a condenser connected to an upstream side of the comparator.

56. A control device according to claim 53, further comprising a feed back control device that adjusts the target output voltage Vout0 by feed back controlling the output voltage of the DC—DC converter.

57. A control device according to claim 53, further comprising a time shortening device that shortens the close timing of the switch in the DC—DC converter by processing the control signals immediately after the start of the DC—DC converter.

58. A control device according to claim 53, wherein the DC—DC converter supplies the input voltage Vin from a high voltage power source to a low voltage power source by dropping to the target output voltage Vout0.

59. A control device for a chopper type DC—DC converter, that controls an output voltage of the DC—DC converter by open/close control of two switches in the DC—DC converter, comprising:

a controller that outputs two control signals for controlling closing the two switches with the timings of t1 and t2 to obtain a target output voltage Vout0 from an input voltage Vin of the DC—DC converter, wherein the DC—DC converter is feed forward controlled by the controller, and wherein the DC—DC converter includes a transformer whose wiring is N:1, the timings t1 and t2 are defined relative to the input voltage Vin and the target output voltage Vout0 by the equation $$(Vin/N - Vout0) \cdot t1 = Vout0 \cdot t2.$$

60. A control device according to claim 59, wherein the controller includes:

a first voltage-current converter that converts the voltage (Vin−Vout0) to the current;

a second voltage-current converter that converts the voltage Vout0 to the current;

a first switch connected to the first voltage-current converter;

a second switch connected to the second voltage-current converter;

a comparator connected to the first and second switches, and that compares a predetermined upper limit value and a predetermined lower limit value with the input voltage; and an open/close device that supplies the output and inverse output from the comparator to the second and first switches respectively, and wherein the two switches in the DC—DC converter are feed forward controlled by using the output and inverse output from the comparator as the control signals.

61. A control device according to claim 60, further comprising a condenser connected to an upstream side of the comparator.

62. A control device according to claim 59, further comprising a feed back control device that adjusts the target output voltage Vout0 by feed back controlling the output voltage of the DC—DC converter.

63. A control device according to claim 59, further comprising a time shortening device that shortens the close timing of the switch in the DC—DC converter by processing the control signals immediately after the start of the DC—DC converter.

64. A control device according to claim 59, wherein the DC—DC converter supplies the input voltage Vin from a high voltage power source to a low voltage power source by dropping to the target output voltage Vout0.

* * * * *